(12) United States Patent
Bouvais (10) Patent No.: US 12,023,799 B2
(45) Date of Patent: Jul. 2, 2024

(54) SUCTION BOX FOR A GRIPPER

(71) Applicant: DEFITECH, Entrelacs (FR)

(72) Inventor: Vincent Bouvais, Entrelacs (FR)

(73) Assignee: DEFITECH, Entrelacs (FR)

( * ) Notice: Subject to any disclaimer, the term of this patent is extended or adjusted under 35 U.S.C. 154(b) by 0 days.

(21) Appl. No.: 18/018,302

(22) PCT Filed: Jul. 12, 2021

(86) PCT No.: PCT/FR2021/051291
§ 371 (c)(1),
(2) Date: Jan. 27, 2023

(87) PCT Pub. No.: WO2022/023637
PCT Pub. Date: Feb. 3, 2022

(65) Prior Publication Data
US 2023/0286173 A1  Sep. 14, 2023

(30) Foreign Application Priority Data
Jul. 28, 2020 (FR) .................................. 20/07944

(51) Int. Cl.
*B25J 15/06* (2006.01)
*B25J 19/00* (2006.01)

(52) U.S. Cl.
CPC ......... *B25J 15/0683* (2013.01); *B25J 19/007* (2013.01)

(58) Field of Classification Search
CPC . B25J 15/0683; B25J 15/0691; B66C 1/0237; B66C 1/025; B66C 1/0281; B66C 1/0287
USPC .......................................... 294/188, 189, 65
See application file for complete search history.

(56) References Cited

U.S. PATENT DOCUMENTS

| | | | | |
|---|---|---|---|---|
| 2,572,640 A * | 10/1951 | Lovegrove | ............. | G03B 27/60 269/21 |
| 3,377,096 A * | 4/1968 | Wood | .................... | B66C 1/0231 248/363 |
| 4,787,662 A * | 11/1988 | Dewez | .................. | B65G 47/91 414/752.1 |
| 9,573,280 B2 * | 2/2017 | Harter | .................. | B25J 15/0691 |
| 10,118,805 B2 * | 11/2018 | Mueller | ................ | B66C 1/0231 |

(Continued)

FOREIGN PATENT DOCUMENTS

WO  2019175854 A1  9/2019

OTHER PUBLICATIONS

International Search Report (English) dated Nov. 8, 2021; International Application No. PCT/FR2021/051291, Filed Jul. 12, 2021; 2 pages.

(Continued)

*Primary Examiner* — Dean J Kramer
(74) *Attorney, Agent, or Firm* — CANTOR COLBURN LLP (57) ABSTRACT

A suction box for a gripper includes:
  a first part made of composite material,
  a second part made of composite material, the second part including orifices, and
  a third part connected, on the one hand, to the first part and, on the other hand, to the second part to form at least one cavity of the suction box. The third part is made of composite material. The first part and the third part are connected to each other by bonding. The second part and the third part are connected to each other by bonding.

19 Claims, 4 Drawing Sheets

(56) References Cited

U.S. PATENT DOCUMENTS

| | | | |
|---|---|---|---|
| 11,420,401 B2* | 8/2022 | Michl | B25J 15/0658 |
| 2018/0215048 A1 | 8/2018 | Bogner | |
| 2020/0130957 A1* | 4/2020 | Borowski | B25J 15/0616 |

OTHER PUBLICATIONS

International Search Report (Non-English) dated Nov. 8, 2021; International Application No. PCT/ FR2021/051291, Filed Jul. 12, 2021; 4 pages.
Written Opinion (non-English) dated Nov. 8, 2021; International Application No. PCT/FR2021/051291, Filed Jul. 12, 2021; 5 pages.

* cited by examiner

SUCTION BOX FOR A GRIPPER

CROSS REFERENCE TO RELATED APPLICATIONS

This application is a National Stage of PCT Application No. PCT/FR2021/051291 filed on Jul. 12, 2021, which claims priority to French Patent Application No. 20/07944 filed on Jul. 28, 2020, the contents each of which are incorporated herein by reference thereto.

TECHNICAL FIELD

The technical field of the invention concerns a suction box for a gripper.

BACKGROUND

It is known to use a handling device including a movable member and a gripper mounted on the movable member. The movable member is, for example, a lifting cylinder, a lifting tube, a hoist, an articulated arm or a lifting frame. The gripper may grasp one or more objects which may then be moved by actuation of the movable member.

The gripper may grasp an object using a vacuum gripping technique. For this purpose, the gripper may include a suction box coupled to a vacuum generating device, also called a vacuum generator. The function of the vacuum generator is to create a depression making it possible to evacuate the air present in the suction box in order to ensure the gripping of one or more objects by means of one or more members fastened on the suction box. The member or each member is arranged to cooperate with at least one orifice of the suction box so as to suction-hold the object to be grasped in relation to the gripper. Thus, this member or each member may come into contact with the object to be grasped, then a suction is generated, in particular thanks to the vacuum generator, so that the object is grasped by the gripper and is held in relation to the gripper even during movements of the movable member.

In general, it is sought to limit the weight of the gripper. A reduction in the weight of the gripper makes it possible to increase the payload of the handling device, that is to say the weight that the handling device can carry. Alternatively, by reducing the weight of the gripper, it is possible to use, for a defined weight of objects to be grasped successively by the handling device, a handling device that is less powerful and less costly in terms of components. For this purpose, a three-part suction box is known, formed respectively by a first plate, a spacer and a second plate, the spacer separating the first and second plates. The first and second plates may each be made of aluminum or stainless steel or steel or composite material including carbon fibers. The spacer may be made of polyurethane or hard PVC (PVC being the abbreviation of polyvinyl chloride) foam so as to counter its crushing. The first plate, the spacer and the second plate are fastened to each other by screws or rivets.

BRIEF SUMMARY

The object of the invention is to find a solution making it possible to respond to a technical problem relating to the weight of a suction box for a gripper. In this sense, a solution is sought which makes it possible to tend towards a limitation of the weight of the suction box while making it possible to retain a satisfactory robustness of this suction box.

To this end, the invention relates to a suction box for a gripper, the suction box including:
 a first part made of composite material,
 a second part made of composite material, the second part including orifices, and
 a third part connected, on the one hand, to the first part and, on the other hand, to the second part to form at least one cavity of the suction box,
the third part being made of composite material, the first part and the third part being connected to each other by bonding, and the second part and the third part being connected to each other by bonding.

Thus, the advantage of this suction box is that its weight is limited while having satisfactory rigidity. Indeed, the bonding makes it possible to replace the screws and rivets mentioned in the state of the art section, resulting in a weight gain. In addition, the bonding also has the advantage of avoiding the formation of holes to secure the parts by means of rivets or screws which would lead to the presence of areas of weakening of the suction box in the case of shear forces applied orthogonally to the longitudinal axes of the screws or rivets.

The suction box may also include one or more of the following characteristics:
 the third part includes a closed loop extending at the periphery of a first face of the first part and at the periphery of a second face of the second part, the first face being oriented towards the second face, the first part being fastened to the closed loop by bonding and the second part being fastened to the closed loop by bonding;
 the first part and the second part are each in the form of a plate, and the third part is a perforated plate;
 the composite material of the third part includes a matrix and fibers;
 the composite material of the first part includes a matrix and fibers;
 the composite material of the second part includes a matrix and fibers;
 each fiber is chosen from: a carbon fiber, a glass fiber and an aramid fiber;
 the first part and the third part are bonded with an epoxy resin or with an epoxy adhesive, and the second part and the third part are bonded with an epoxy resin or with an epoxy adhesive;
 the first, second and third parts are arranged so that the suction box includes: a fourth part, arms each extending from the fourth part and hollow suction heads, each suction head being arranged at the end of one of the arms opposite the fourth part and each suction head including part of the orifices;
 the fourth part and the arms are hollow, the fourth part includes an opening provided through the first part, and, for each suction head, the interior of the suction head is in fluid communication with the interior of the arm at the end of which said suction head is arranged and with the interior of the fourth part so that each orifice is in fluid communication with the opening;
 at least one of the orifices opens into said at least one cavity and the first part includes an opening communicating with said at least one cavity;
 the third part includes an assembly of several elements.

The invention also relates to a gripper including the suction box as described and at least one member intended to come into contact with at least one object to be grasped, said member being fastened on the second part.

The invention also relates to the handling device, characterized in that it includes a movable member and the gripper as described, the gripper being mounted on the movable member.

The invention also relates to a method for manufacturing a suction box for a gripper, the manufacturing method including the following steps:
- a step of forming a first part made of composite material,
- a step of forming a second part made of composite material, the second part including orifices,
- a step of forming a third part, the third part being made of composite material,
- a step of assembling the first, second and third parts resulting in a formation of at least one cavity of the suction box, the assembly step including a step of fastening the first part to the third part by bonding and a step of fastening the second part to the third part by bonding.

The manufacturing method may also include a step of forming elements intended to be assembled to form the third part and a step of assembling the elements to form the third part, said elements being formed by cutting a composite material plate or by additive manufacturing.

Other advantages and characteristics can emerge from the detailed description which follows.

BRIEF DESCRIPTION OF THE DRAWINGS

The invention will be better understood on reading the detailed description which follows, given solely by way of non-limiting example and made with reference to the appended drawings listed below.

In these figures, the same references are used to designate the same elements.

DETAILED DESCRIPTION

Figure 1:
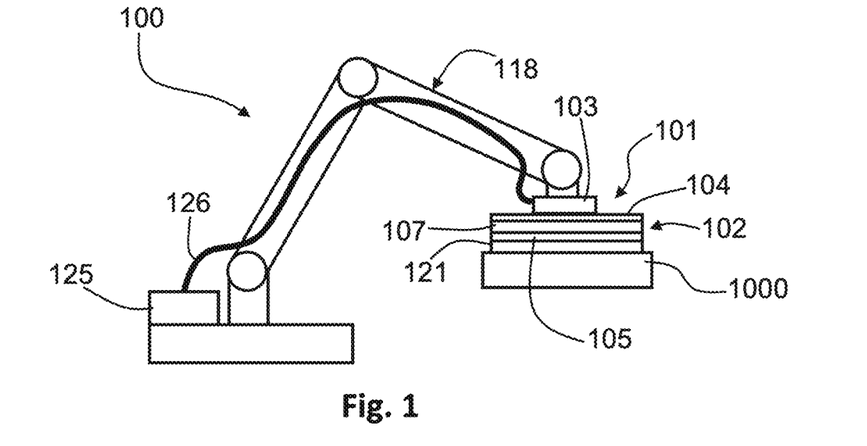
FIG. 1 illustrates, in a schematic view, a handling device of the gripping robot type equipped with a gripper with a suction box according to one embodiment of the invention.

The gripping of an object 1000, such as for example visible in FIG. 1, by a gripper 101 makes it possible to grasp the object 1000 with a view to manipulating it and/or to moving it.

The invention relates to a suction box 102 for the gripper 101. Two particular embodiments of the gripper 101 are illustrated in FIGS. 2 to 5. The suction box 102 is also called a vacuum box in the technical field of the present invention.

The gripper 101 may include a vacuum generating device 103, also called a vacuum generator in the technical field of the present invention, an example of which is visible in FIG. 1. In fact, the vacuum generating device 103 may be integrated into the gripper 101, for example in this case the vacuum generating device 103 may include a venturi cartridge integral with the suction box 102. Alternatively, the vacuum generating device 103 is separated from the gripper 101, it is then considered to be remote and may be connected to the gripper 101 by means of a pipe allowing the contents of the suction box 102 to be sucked. Thus, more generally, the suction box 102 may be coupled to the vacuum generating device 103 by directly mounting the vacuum generating device 103 on the suction box 102 or through the pipe connecting the suction box 102 to the vacuum generating device 103.

In this sense, although FIGS. 2 to 5 do not show the gripper 101 with the vacuum generating device 103, the vacuum generating device 103 can be mounted on the suction box 102 as for example illustrated in FIG. 1 to be integrated into the gripper 101.

FIG. 1 schematically illustrates a handling device 100 including the gripper 101. Such a handling device 100 makes it possible, after having grasped the object 1000 via the gripper 101, to move this object 1000 before releasing this object 1000.

Figure 2:
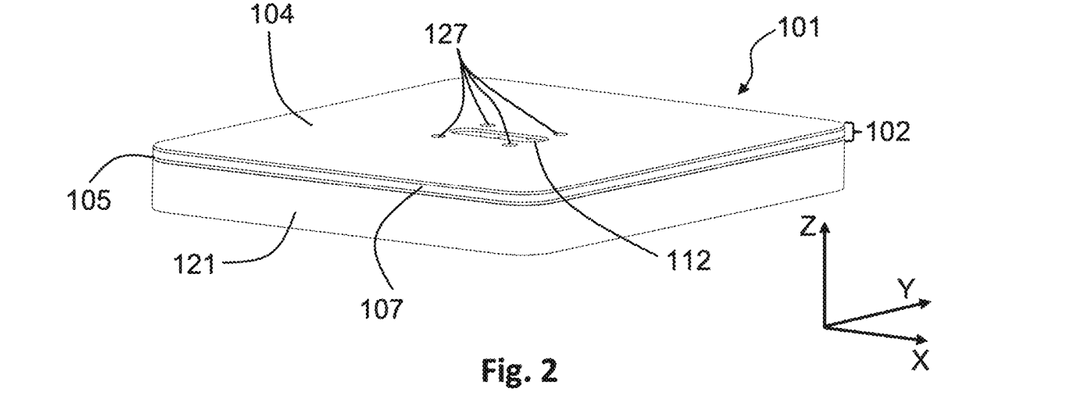
FIG. 2 illustrates, in a perspective view, a gripper including a suction box, this suction box being according to a first embodiment of the invention.
Figure 3:
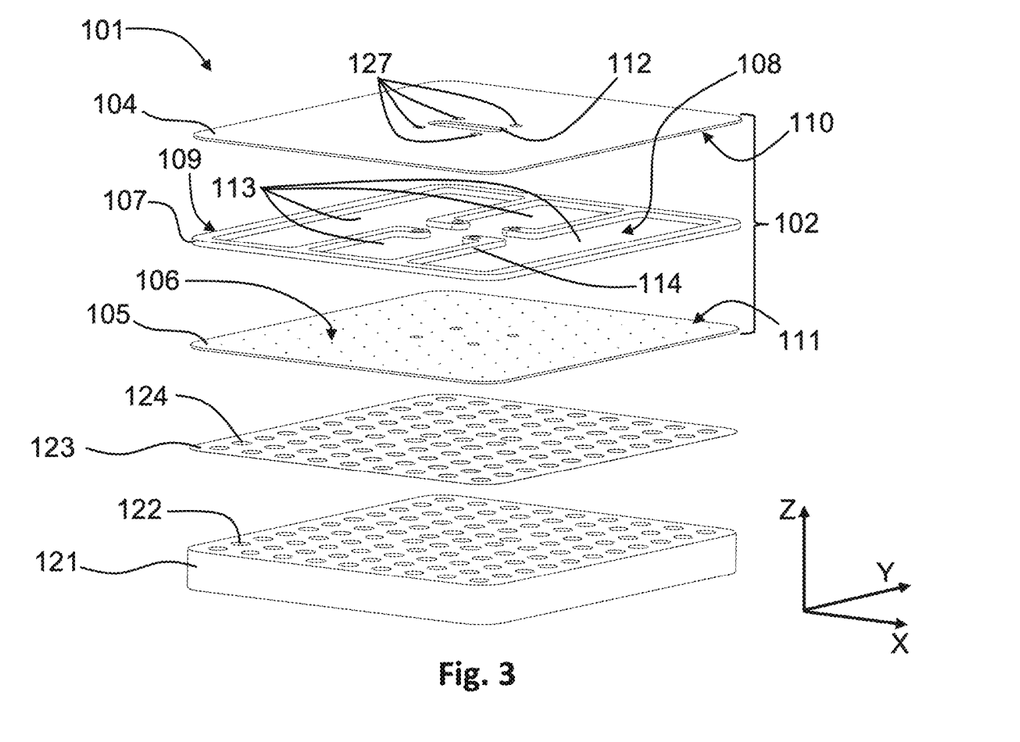
FIG. 3 illustrates, in an exploded perspective view, the gripper of FIG. 2.
Figure 4:
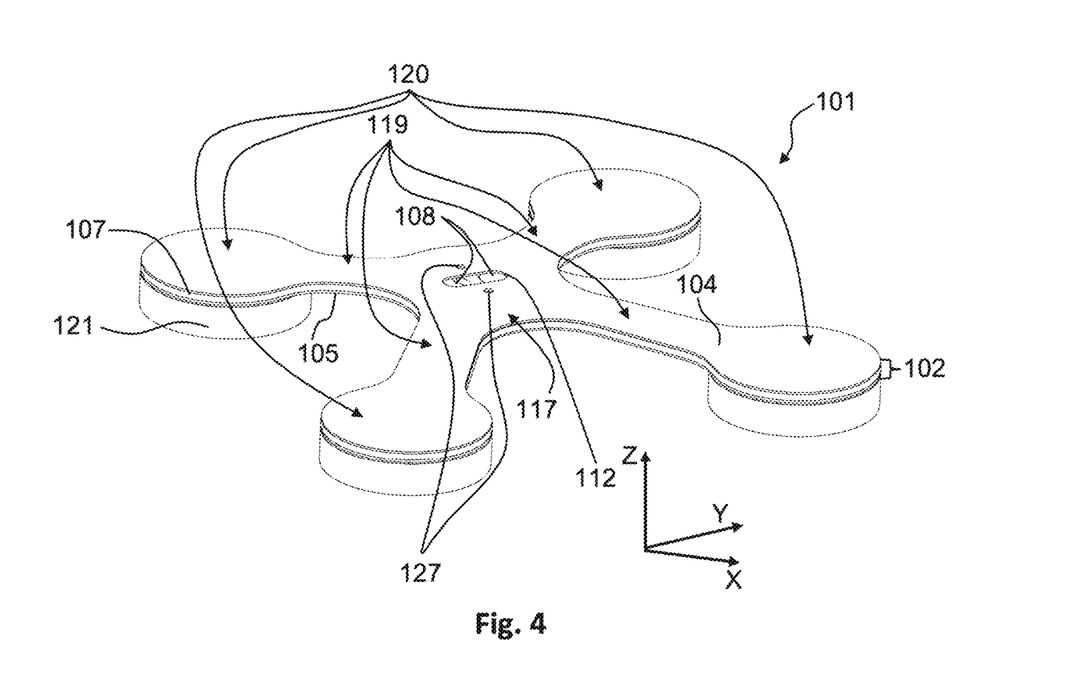
FIG. 4 illustrates, in a perspective view, the gripper whose suction box is according to a second embodiment of the invention.
Figure 5:
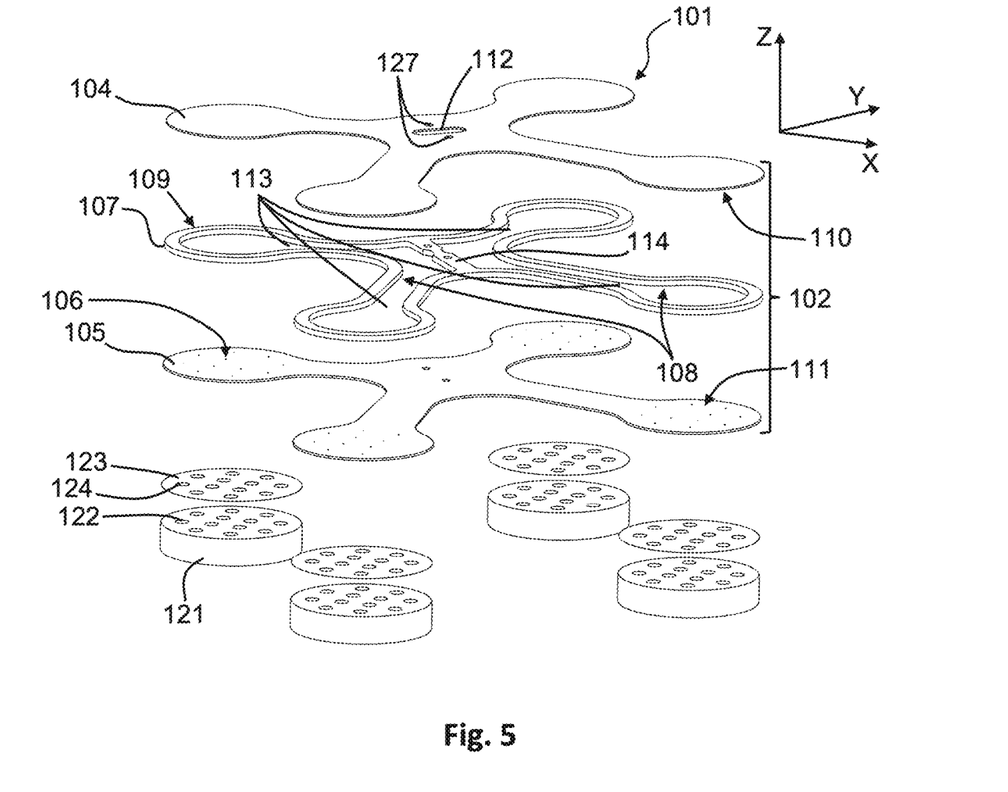
FIG. 5 illustrates, in an exploded perspective view, the gripper of FIG. 4.

An orthonormal reference frame XYZ of the gripper 101 is defined, represented by the axes X, Y and Z in FIGS. 2 to 5. In particular, the exploded views visible in FIGS. 3 and 5 are represented by staggering the parts, respectively visible in FIGS. 2 to 4, of the gripper in a direction parallel to the axis Z. Each thickness mentioned in the present description is a dimension parallel to the axis Z.

The suction box 102 includes a first part 104 made of composite material and a second part 105 made of composite material. The advantage of using first and second parts 104, 105 each made of composite material is that it is possible to reduce their mass while retaining an appropriate rigidity of these first and second parts 104, 105.

The second part 105 includes orifices 106 (for example visible in FIGS. 3 and 5 on which the orifices 106 are illustrated by dots) also called suction orifices for grasping the object 1000. These orifices 106 are intended to participate to the grasping of the object 1000 and the holding, in relation to the gripper 101, of the object 1000 grasped by aspiration or suction.

In fact, the function of the vacuum generating device 103 is to suck inside the suction box 102 which may cause suction, if appropriate, via the orifices 106 or via a plurality of these orifices 106.

Preferably, the orifices 106 are arranged so as to allow, during gripping, the suction of air outside the suction box 102 in the suction box 102. Thus, the orifices 106 may each pass through the second part 105, in particular according to its thickness. Thus, each orifice 106 opens, on the one hand, into the suction box 102 and, on the other hand, outside the suction box 102. The orifices 106 are therefore formed by through holes provided in the second part 105.

The section, the shape and the spacing of the orifices 106 may vary according to the technical needs linked to the object 1000 to be grasped and moved.

The suction box 102 includes a third part 107 connected, on the one hand, to the first part 104 and, on the other hand, to the second part 105 to form, that is to say thus forming, at least one cavity 108 of the suction box 102. In other words, the assembly of the first, second and third parts 104, 105, 107 delimits said at least one cavity 108, that is to say the or each cavity 108. Thus, the suction box 102 may include one or more cavities 108. The third part 107 is made of composite material. The first part 104 and the third part 107 are connected to each other by bonding. In other words, the first part 104 and the third part 107 are fastened to each other by bonding. The second part 105 and the third part 107 are connected to each other by bonding. In other words, the second part 105 and the third part 107 are fastened to each other by bonding. The use of the first, second and third parts 104, 105, 107 each made of composite material and assembled by bonding the first part 104 to the third part 107 and by bonding the second part 105 to the third part 107 has one or more of the following advantages:

- this makes it possible, in particular in comparison with an assembly by mechanical fastening using screws or rivets, to stiffen and therefore reduce the phenomena of deformation of the first, second and third parts 104, 105, 107 thanks to the bonding of these first and second parts 104, 105 on the third part 107 and thanks to the use of a composite material to form the third part 107,
- this makes it possible to reduce the size, in particular the thickness, of the suction box 102 and therefore of the gripper 101 by taking into account a desired stiffness of the suction box 102, this therefore allowing better integration of the gripper 101 including such a suction box 102,
- this makes it possible to reduce the weight of the suction box 102 compared to an assembly by mechanical fastening with screws or rivets,
- this makes it possible to reduce the energy consumption of the handling device 100 for moving the gripper 101, in particular due to the reduction in weight obtained by the assembly by bonding in comparison with an assembly by rivets or screws,
- this makes it possible to gain, for the handling device 100, in capacity for lifting or manipulating object(s),
- this allows the handling device 100 equipped with such a suction box 102 to have manipulating mechanisms chosen to reduce its manufacturing, maintenance and operating costs.

It follows from what has been described previously that the first part 104 is bonded on the third part 107 and that the second part 105 is bonded on the third part 107 so as to ensure a holding of the first, second and third parts 104, 105, 107 in relation to each other: they are then integral with each other.

In particular, the first, second and third parts 104, 105, 107 may form outer walls of the suction box 102.

Preferably, the third part 107 is arranged between the first part 104 and the second part 105.

The first and second parts 104, 105 may be plates and their respective bonding on the third part 107 makes it possible, while retaining satisfactory rigidity, to reduce the thickness of these plates, thus offering a gain in thickness of the suction box 102 and therefore a weight gain of the suction box 102.

The thickness of the first part 104, the thickness of the second part 105 and the thickness of the third part 107 will of course be adapted according to requirements.

Preferably, the third part 107 includes a closed loop 109, as illustrated for example in FIGS. 3 and 5, forming in particular an outer edge of the third part 107. This closed loop 109 extends at the periphery of a first face 110 of the first part 104 and of a second face 111 of the second part 105. The first face 110 is oriented towards the second face 111. The first part 104, in particular the first face 110, is fastened to the closed loop 109 by bonding. The second part 105, in particular the second face 111, is fastened to the closed loop 109 by bonding. This closed loop 109 forms a lateral wall of the suction box 102 and has the advantage of allowing, in particular in cooperation with the first and second parts 104, 105, and if appropriate with the material ensuring the bonding fastening the first and second parts 104, 105 to the third part 107, to laterally close the suction box 102. Preferably, the first part 104 and the second part 105 are here each in the form of a plate. The third part 107 may be a perforated plate. This perforated plate, which may also be called a recessed plate, includes one or more holes, or one or more recesses, passing through the perforated plate according to its thickness. In fact, the perforated plate forming the third part 107 may allow fluid communication of all or part of the orifices 106 with an opening 112 provided in the first part 104. The opening 112 is intended to cooperate with, that is that is to say to be coupled to, the vacuum generating device 103 which, in operation, sucks the interior of the suction box 102 through this opening 112, in particular to tend to create a vacuum in the or in each cavity 108, in order to allow suction through the orifices 106. The suction box 102 formed by means of the first, second and third parts 104, 105, 107 in the form of plates assembled by bonding makes it possible to obtain a robust and in particular with limited thickness suction box 102.

The third part 107 notably also has the function of forming a spacer making it possible to delimit laterally, that is to say parallel to the plane XY, the interior of the suction box 102 and thus preferentially form a reserve of vacuum. Preferably, the fastening by bonding of the third part 107 to the first and second parts 104, 105 seals the suction box 102 laterally so that, during operation of the gripper 101, the air sucked from outside the suction box 102 towards the inside of the suction box 102 is only through the orifices 106.

In fact, the third part 107 may form a framework intended to receive the first and second parts 104, 105 so that the assembly of the first, second and third parts 104, 105, 107 delimits an internal volume of the suction box 102 for preferably enabling the communication between the orifices 106 and the opening 112 or between each of sets of orifices 106 and a corresponding opening 112.

An advantage of the third part 107, in particular when it forms the framework, is that it makes it easy to compartmentalize the suction box 102 so that the latter includes several independent cavities 108 also called suction chambers. In this case, a common vacuum generating device 103 may be used to suck in all the cavities 108 or a plurality of vacuum generating devices 103 may each suck in one of the cavities 108 associated with it (not shown): it is thus possible in the context of the gripping of one or more objects 1000 to select the cavities 108 which will participate in the gripping of the object(s) 1000.

Thus, in general, at least one of the orifices 106 may open into said at least one cavity 108 and the first part 104 may include the opening 112 communicating with, in particular opening into, said at least one cavity 108. In other words, the or each cavity 108 may communicate with at least one of the orifices 106 and with a corresponding opening 112 provided in the first part 104. The first part 104 may include a single opening 112 communicating with several cavities 108 (see for example FIGS. 4 and 5) or one opening 112 for each cavity 108 (not shown).

The framework also makes it possible to delimit channels 113 for air circulation in the suction box 102.

The suction box 102 may include one or more reinforcements 114 called "structural reinforcements" improving the rigidity of the third part 107 and therefore the rigidity of the suction box 102. The reinforcement(s) 114 may each be fastened by bonding, on the one hand, to the first part 104 and, on the other hand, to the second part 105.

The reinforcements 114 may participate in delimiting, for example by means of the closed loop 109, the channels 113 (see for example FIGS. 3 and 5) for air circulation in the suction box 102. For example, four reinforcements 114 are illustrated in FIG. 3 to delimit channels 113 of the same cavity 108 and one reinforcement 114 is illustrated in FIG. 5.

The reinforcements 114 may make it possible to compartmentalize the interior of the suction box 102 by forming partitions each connected/fastened, in particular by bonding, to the first part 104 and to the second part 105.

The third part 107 may therefore include the closed loop 109 and one or more reinforcements 114 which extend for example in the form of branches from the closed loop 109.

In FIG. 5, the suction box 102 includes two cavities 108 each communicating with the opening 112 of the first part 104. These two cavities 108 are separated by a reinforcement 114 serving in particular to prevent the crushing of the box 102 during its fastening to a movable member 118 of the handling device 100 and/or during coupling the vacuum generating device 103 to the suction box 102.

Thus, the shape, the number and the dimensions of the reinforcements 114 may vary according to the needs to ensure the rigidity of the suction box 102 and, if appropriate, to prevent its crushing parallel to the axis Z.

It was previously mentioned that the first part 104, the second part 105 and the third part 107 were each made of composite material. It is understood by this that the first part 104, the second part 105 and the third part 107 are each formed of a composite material. The composite material may be the same for the first part 104, the second part 105 and the third part 107 or may be different between two of these parts. Thus, the composite material of the third part 107 may include a matrix and fibers, and/or the composite material of the first part 104 includes a matrix and fibers, and/or the composite material of the second part 105 may include a matrix and fibers. This has the advantage of reinforcing the rigidity, if appropriate, of the first part 104 and/or of the second part 105 and/or of the third part 107.

Each fiber may be chosen from: a carbon fiber, a glass fiber and an aramid fiber (for example Kevlar®). In other words, within each of the first, second and third parts 104, 105, 107 the fibers may be of the same material or different materials may be used. Such fibers have the advantage of ensuring satisfactory rigidity of the suction box 102 while allowing its weight to be limited. An advantage of carbon and/or glass and/or aramid fibers in the composite material forming the corresponding part (first part 104, second part 105 or third part 107) is that this part may exhibit a greater deformation before alteration than if it were made of aluminum or steel.

The composite material may include a 3K twill weave. This may in particular be a 3K twill carbon weave.

Figure 6:
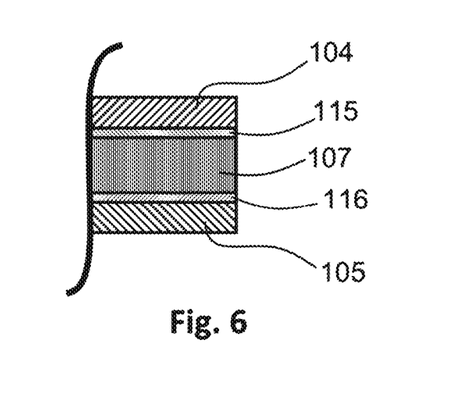
FIG. 6 illustrates a partial cross-sectional view at one edge of the suction box according to one embodiment of the invention.

Preferably, the first part 104 and the third part 107 are bonded with an epoxy resin, and the second part 105 and the third part 107 are bonded with an epoxy resin. Speaking of two things, here parts, bonded with the epoxy resin, it is understood that the epoxy resin is in a cured state where it ensures the holding of the two things bonded to each other. Although the epoxy resin is not shown in FIGS. 2 to 5, a cross-sectional view, along the plane XZ at a lateral edge of the suction box 102, may be schematically shown as in FIG. 6. FIG. 6 thus shows a first film 115 of epoxy resin in the cured state bonding the first part 104 to the third part 107 and a second film 116 of epoxy resin in the cured state bonding the second part 105 to the third part 107. The advantage of using epoxy resin for the bonding is that it makes it possible to ensure adequate holding of the first, second and third parts 104, 105, 107 therebetween and that this bonding counters the delamination of the first, second and third parts 104, 105, 107. Of course the epoxy resin may bond the closed loop 109, on the one hand, to the first part 104 (in particular to the first face 110) and, on the other hand, to the second part 105 (in particular to the second side 111).

"Epoxy resin in the cured state" means a polymer obtained after curing of a thermosetting polymer in the liquid state including a resin and a curing agent.

Alternatively, each bonding mentioned in the present description may be carried out with an epoxy adhesive instead of the epoxy resin. Thus, the terms "epoxy resin" may be replaced by the terms "epoxy adhesive" in the context of bonding two things such as for example the first and third parts 104, 107 to each other or the second and third parts 105, 107 to each other. The epoxy adhesive is suitable for ensuring the bonding sought in the present description.

In the present description, by "things connected or fastened by bonding", it is understood in particular that a material ensures the corresponding bonding, this material possibly being epoxy resin in the cured state or epoxy adhesive. In particular, the thickness of this material is adapted as needed to ensure satisfactory bonding.

In particular, the matrix of each of the first, second and third parts 104, 105, 107 is made of epoxy resin in the cured state. In this case, the epoxy resin bonding, on the one hand, the first part 104 to the third part 107 and, on the other hand, the second part 105 to the third part 107 may be identical to the epoxy resin forming the matrices. This has the advantage of ensuring better bonding of the first part 104 on the third part 107 and of the second part 105 on the third part 107.

The suction box 102 of FIGS. 2 and 3 has, seen parallel to the axis Z, a rectangular profile. This is particularly suitable for a gripper 101 intended to grasp a carton, a board, a panel or any other solid object. Of course, the dimensions and the shapes of the suction box 102 may be adapted according to the dimensions and the weight of the object 1000 to be grasped. Thus, the suction box 102 may equally well exhibit, seen parallel to the axis Z, a square profile, a round profile or an oval profile.

Advantageously, to further save weight at the suction box 102, the suction box 102 may exhibit, seen parallel to the axis Z, a more complex profile than a simple rectangle, square, round or oval. The use of such a more complex profile is made easier to implement due to the use of the first, second and third parts 104, 105, 107 assembled by bonding while retaining the desired rigidity and solidity of the gripper 101. The shape of the suction box 102 may then be adapted as needed. Indeed, it is thus possible to reduce the outer surface of the suction box 102 to the strict minimum to ensure the function of the suction box 102 with as a bonus a reduction in the weight of the suction box 102. In this case, the first, second and third parts 104, 105, 107 may be arranged/assembled so that the suction box 102 includes (as for example visible in FIG. 4):

a fourth part 117, for example forming a central part, in particular intended to be connected to the movable member 118 (FIG. 1) of the handling device 100 and/or to the vacuum generating device 103,     arms 119 each extending from the fourth part 117,     hollow suction heads 120.

Each suction head 120, then arranged at the end of one of the arms 119 opposite the fourth part 117, includes part of the orifices 106 (in particular each head 120 includes several of the orifices 106). The or each orifice 106 of said suction head 120 opening into a hollow space of said suction head 120, in particular said hollow space participating in delimiting the cavity 108 or one of the cavities 108.

In general, the fourth part 117, the arms 119 and the suction heads 120 each respectively include a portion of the first part 104, a portion of the second part 105 and a portion of the third part 107.

Preferably, the arms 119 and the fourth part 117 are hollow, they therefore each include a hollow space which can participate in delimiting the cavity 108 or one of the cavities 108. The fourth part 117 includes the opening 112 provided through the first part 104 in particular along its thickness. In this case, the hollow space of each suction head 120 is in fluid communication with the hollow space of the arm 117 at the end of which the suction head 120 is arranged, and the hollow space of each arm 119 is in fluid communication with the hollow space of the fourth part 117 from which it ultimately results that each orifice 106 is in fluid communication with the opening 112. This is in particular what is represented in the example of FIG. 4 where the suction box 102 includes, by way of example, four arms 119. In other words, for each suction head 120, the interior of said suction head 120 is in fluid communication with the interior of the arm 119 at the end of which said suction head 120 is arranged and with the interior of the fourth part 117 so that each orifice 106 is in fluid communication with the opening 112. This has the advantage of being capable of using a single vacuum generating device 103 coupled to the opening 112 for generating suction at each suction head 120.

According to an example not shown where the arms 119 are not hollow, the first part 104 may include as many openings 112 as suction heads 120, and each opening 112 opens into the hollow space (thus forming a corresponding cavity) of one of the suction heads 120. In this case, each opening 112 may be intended to be coupled with its own vacuum generating device 103 or with a vacuum generating device 103 common to all the openings 112.

In FIGS. 4 and 5, the suction box 102 is particularly suitable, due to its general cross shape, to allow the gripper 101 to grasp a carton-type object at angles, that is to say corners, of the same face of the carton from which results an optimized grasping allowing a better holding of the carton by the angles of its grasped face, in particular when the carton is damaged or deformed in the center of its face grasped by the gripper 101. Furthermore, this has the advantage of limiting the suction surface of the gripper 101 to what is strictly necessary to enable gripping in order to limit the suction energy necessary for gripping. Thus, the suction box 102 may include four arms 119, two of the arms 119 being coaxial along a first axis and two other arms 119 being coaxial along a second axis. The first and second axes form an angle between them, preferably the first and second axes are orthogonal to each other.

The invention also relates to the gripper 101 including the suction box 102 as described above. The gripper 101 optionally includes the vacuum generating device 103 configured to suck the interior of the suction box 102 in order to create a depression at a plurality, or each, of the orifices 106. The gripper 101 includes at least one member 121 intended to come into contact with at least one object 1000 to be grasped, said member 121 being fastened on the second part 105 of course outside the suction box 102 and preferably opposite the second face 111. Of course, such a gripper 101 may have the advantages as described above in the context of the suction box 102. Generally, such a gripper 101 is robust and light.

In particular, the gripping of an object 1000 by the gripper 101 has been described, but this gripper 101 may also allow the gripping of several objects 1000 at the same time, in particular thanks to a member 121 or to several members 121.

The member 121 may be: a suction cup (not shown) for example coupled to one of the orifices 106 which makes it possible to create a vacuum in the suction cup when it is in contact with the object 1000 to be grasped; an openwork foam; an openwork rubber plate; or an openwork silicone plate.

In FIGS. 1 to 5, the member 121 (FIGS. 1, 2 and 3) or each member 121 (FIGS. 4 and 5 showing four members 121) represented is an openwork foam, an openwork rubber plate or an openwork silicone plate which has the particular advantage of being capable of deforming during gripping to conform to a surface of the object 1000 to be grasped. In particular, in this case by "openwork", it is understood that the member 121 or each member 121 includes through holes 122 each arranged to be in fluid communication with one of the orifices 106. For example, the member 121 or each member 121 may be fastened to the suction box 102 by a double-sided self-adhesive film 123 provided with through holes 124 each coinciding with one of the through holes 122 of the member 121 or of one of the members 121.

Regarding the vacuum generating device 103, there are different types which are well known to those skilled in the art. For example, the vacuum generating device 103 may operate according to the principle of a venturi vacuum pump. In this case, the vacuum generating device 103 may include a venturi cartridge including a first inlet intended to receive compressed air generated by a compressor 125 and conveyed by a pipe 126 (FIG. 1), a second inlet in fluid communication with the interior (the cavity 108) of the suction box 102 in particular via the opening 112, and a mixer allowing the evacuation of air towards the outside of the venturi cartridge. The venturi cartridge includes a nozzle at its first inlet, the nozzle being intended to be fed with the compressed air coming from the compressor 125. The second inlet is arranged to open into the venturi cartridge between the nozzle and the mixer so that the air jet at the outlet of the nozzle drives the air present in the suction box 102 to the mixer which allows the evacuation of the air coming from the nozzle and of the air coming from the suction box 102. Alternatively the vacuum generating device 103 may be a vacuum pump or a vacuum turbine, in these alternatives the vacuum generating device 103 may be separated from the gripper 101 and be connected to the gripper 101 by a pipe for example coupled to the opening 112. When the vacuum generating device 103 operates according to the principle of a venturi vacuum pump, it may also be coupled to the suction box 102 by a pipe.

The suction box 102 may include fastening holes 127 which may serve, in particular using bolts:
- the fastening of the suction box 102 to a support belonging to the movable member 118, and/or
- the fastening of the vacuum generating device 103 to the suction box 102 or of a pipe to the suction box 102, the pipe coming from the vacuum generating device 103 and being coupled to the suction box 102 to suck the inside.

These fastening holes 127 pass through the suction box 102 and in particular the first part 104, the second part 106 and the third part 107.

Of course, the invention also relates to the handling device 100 which includes the movable member 118 and the gripper 101 as described, the gripper 101 being mounted on the movable member 118 in particular by any suitable fastening means.

Such a handling device 100 is advantageous in particular in the sense that it may consume less energy, be suitable for use in the field of robotics in general and of human-robot collaboration or cooperation. Of course, the handling device 100 may include the vacuum generating device 103, for example mounted on or coupled to the first part 104 on a face of the first part 104 opposite the first face 110.

The invention also relates to a method of manufacturing the suction box 102. This manufacturing method includes a step of forming the first part 104 for example by machining a plate, a step of forming the second part 105 for example by machining a plate, a step of forming the third part 107, and a step of assembling the first, second and third parts 104, 105, 107 resulting in the formation of said at least one cavity 108. The assembly step includes a step of fastening the first part 104 to the third part 107 by bonding and a step of fastening the second part 105 to the third part 107 by bonding. Such a manufacturing method makes it possible to manufacture quickly and easily, for example by means of a suitable bonding using for example epoxy adhesive or epoxy resin, the suction box 102 so that it is robust and light without requiring the use of screws or rivets, which would require numerous drillings which induce a weakening of the suction box 102 and an increase in its weight compared to the present invention. The bonding makes it possible to simplify manufacture while reducing the time necessary for assembling the first, second and third parts 104, 105, 107. In addition, the bonding ensures sealing of the suction box 102 between the first part 104 and the third part 107 as well as between the second part 105 and the third part 107.

Figure 7:
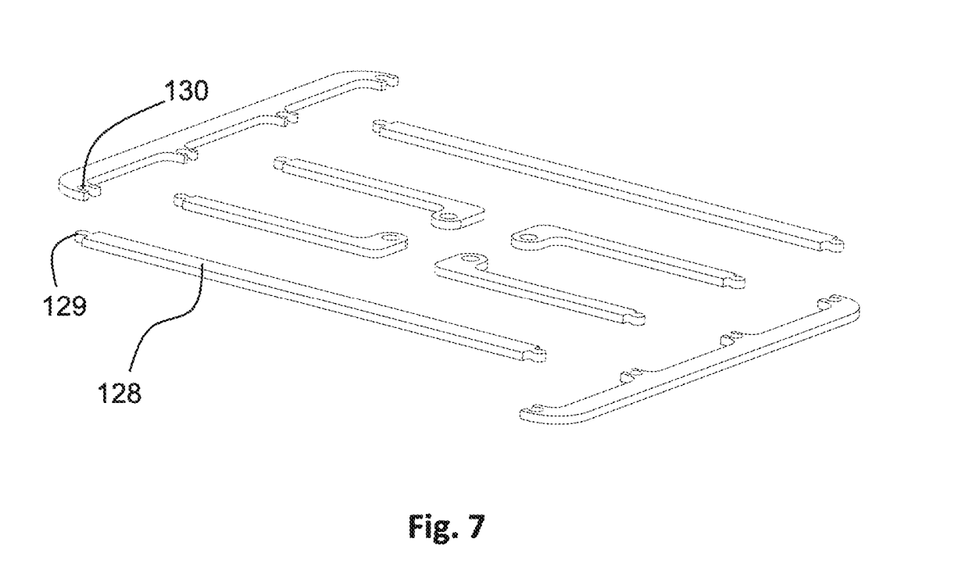
FIG. 7 illustrates separate elements intended to form part of the suction box according to a particular embodiment of the invention.
Figure 8:
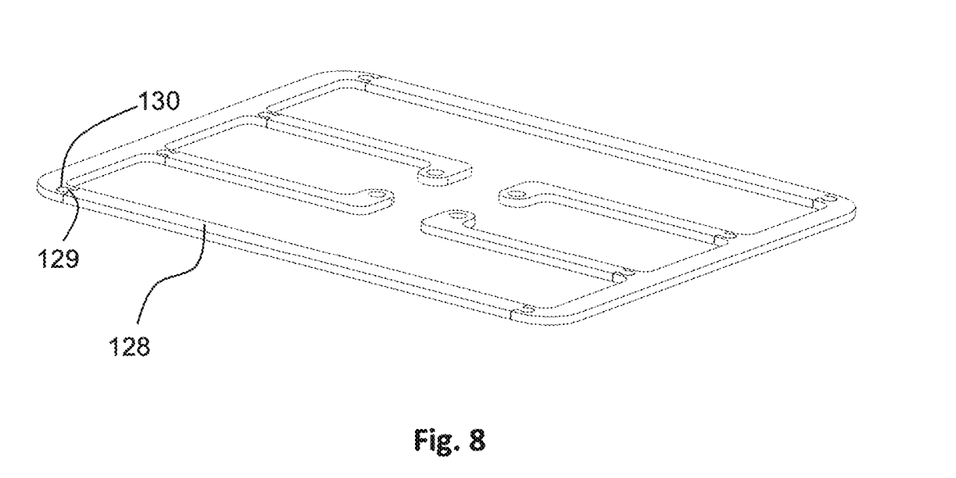
FIG. 8 illustrates the elements of FIG. 7 assembled.

According to one embodiment of the manufacturing method, the latter may include a step of forming elements 128 for example as illustrated in FIG. 7 to form the third part 107 of the type used to manufacture the suction box 102 visible in FIGS. 2 and 3. These elements 128 are intended to be assembled to form the third part 107. Thus, the manufacturing method further includes a step of assembling the elements 128 to form the third part 107. This makes it possible to form the third part 108 by limiting the loss of material in the sense that the elements 128 may be formed by cutting in a composite material plate which may then be of dimensions smaller than the dimensions of the third part 107 or even by 3D printing also called additive manufacturing. In the example shown in FIG. 7, the elements 128 are for example eight in number and are assembled in pairs (FIG. 8) by interlocking and in particular bonding, preferably with an epoxy resin, of a male part 129 in a female part 130. This has the advantage of guaranteeing precise positioning of the elements 128 and guaranteeing quality while simplifying the assembly.

In the context of the suction box 102, if the third part 107 includes an assembly of several elements 128, for example assembled in the manner described above, the latter has the advantage of having a limited cost.

Everything that applies to the method of manufacturing the suction box 102 may of course apply to the suction box 102 and conversely everything that applies to the suction box 102 may of course apply to the method of manufacturing the suction box 102.

Thus, the present invention clearly finds an industrial application in the field of the manufacture of suction boxes or in the handling of objects in an industrial process for example and in a non-limiting manner in the field of the use of robots especially collaborative.

The invention claimed is:

1. A suction box for a gripper, the suction box including:
a first part made of composite material,
a second part made of composite material, the second part including orifices, and
a third part connected, on the one hand, to the first part and, on the other hand, to the second part to form at least one cavity of the suction box,
wherein
the third part is made of composite material,
the first part and the third part are connected to each other by bonding,
the second part and the third part are connected to each other by bonding, wherein the at least one cavity is at least in part delimited by the first part, the second part and an outer wall of the third part, the outer wall being a closed loop extending about a periphery of a first face of the first part and about a periphery of a second face of the second part, the first face being oriented towards the second face, the first part being fastened to the closed loop by bonding and the second part being fastened to the closed loop by bonding.

2. The suction box according to claim 1, wherein the first part and the second part are each in the form of a plate and the third part is a perforated plate.

3. The suction box according to claim 2, wherein:
the composite material of the third part includes a matrix and fibers, and/or
the composite material of the first part includes a matrix and fibers, and/or
the composite material of the second part includes a matrix and fibers.

4. The suction box according to claim 3, wherein each fiber is chosen from: a carbon fiber, a glass fiber and an aramid fiber.

5. The suction box according to claim 4, wherein the first part and the third part are bonded with an epoxy resin or with an epoxy adhesive, and wherein that the second part and the third part are bonded with an epoxy resin or with an epoxy adhesive.

6. The suction box according to claim 5, wherein the first, second and third parts are arranged so that the suction box includes:
a fourth part,
arms each extending from the fourth part,
hollow suction heads, each suction head being arranged at an end of one of the arms opposite the fourth part and each suction head including part of the orifices.

7. The suction box according to claim 6, wherein:
the fourth part and the arms are hollow,
the fourth part includes an opening provided through the first part, and
for each suction head, the interior of the suction head is in fluid communication with the interior of the arm at the end of which said suction head is arranged and with the interior of the fourth part so that each orifice is in fluid communication with the opening.

8. The suction box according to claim 6, wherein at least one of the orifices opens into said at least one cavity and wherein the first part includes an opening communicating with said at least one cavity.

9. The suction box according to claim 1, wherein:
the composite material of the third part includes a matrix and fibers, and/or
the composite material of the first part includes a matrix and fibers, and/or the composite material of the second part includes a matrix and fibers.

10. The suction box according to claim 9, wherein each fiber is chosen from: a carbon fiber, a glass fiber and an aramid fiber.

11. The suction box according to claim 1, wherein the first part and the third part are bonded with an epoxy resin or with an epoxy adhesive, and wherein that the second part and the third part are bonded with an epoxy resin or with an epoxy adhesive.

12. The suction box according to claim 1, wherein the first, second and third parts are arranged so that the suction box includes:
a fourth part,
arms each extending from the fourth part,
hollow suction heads, each suction head being arranged at an end of one of the arms opposite the fourth part and each suction head including part of the orifices.

13. The suction box according to claim 12, wherein:
the fourth part and the arms are hollow,
the fourth part includes an opening provided through the first part, and
for each suction head, the interior of the suction head is in fluid communication with the interior of the arm at the end of which said suction head is arranged and with the interior of the fourth part so that each orifice is in fluid communication with the opening.

14. The suction box according to claim 1, wherein at least one of the orifices opens into said at least one cavity and wherein the first part includes an opening communicating with said at least one cavity.

15. The suction box according to claim 1, wherein the third part includes an assembly of several elements.

16. A gripper, wherein the gripper includes:
a suction box, the suction box including:
a first part made of composite material,
a second part made of composite material, the second part including orifices, and
a third part connected, on the one hand, to the first part and, on the other hand, to the second part to form at least one cavity of the suction box, wherein the at least one cavity is at least in part delimited by the first part, the second part and an outer wall of the third part, the outer wall being a closed loop extending about a periphery of a first face of the first part and about a periphery of a second face of the second part, the first face being oriented towards the second face, the first part being fastened to the closed loop by bonding and the second part being fastened to the closed loop by bonding,
wherein
the third part is made of composite material,
the first part and the third part are connected to each other by bonding,
the second part and the third part are connected to each other by bonding, and
at least one member intended to come into contact with at least one object to be grasped, said at least one member being fastened on the second part.

17. A handling device, wherein the handling device includes a movable member and a gripper according to claim 16, the gripper being mounted on the movable member.

18. A method for manufacturing a suction box for a gripper, the method including the following steps:
a step of forming a first part made of composite material,
a step of forming a second part made of composite material, the second part including orifices,
a step of forming a third part,
a step of assembling the first, second and third parts resulting in the formation of at least one cavity of the suction box,
wherein:
the third part is made of composite material,
the step of assembling includes a step of fastening the first part to the third part by bonding,
the step of assembling includes a step of fastening the second part to the third part by bonding, wherein the at least one cavity is at least in part delimited by the first part, the second part and an outer wall of the third part, the outer wall being a closed loop extending about a periphery of a first face of the first part and about a periphery of a second face of the second part, the first face being oriented towards the second face, the first part being fastened to the closed loop by bonding and the second part being fastened to the closed loop by bonding.

19. The method according to claim 18, wherein the method includes a step of forming elements intended to be assembled to form the third part and a step of assembling the elements to form the third part, said elements being formed by cutting a composite material plate or by additive manufacturing.

* * * * *